May 12, 1931.  A. C. HOEH  1,804,505
DRIVER FOR REAMERS AND THE LIKE
Filed Jan. 6, 1930
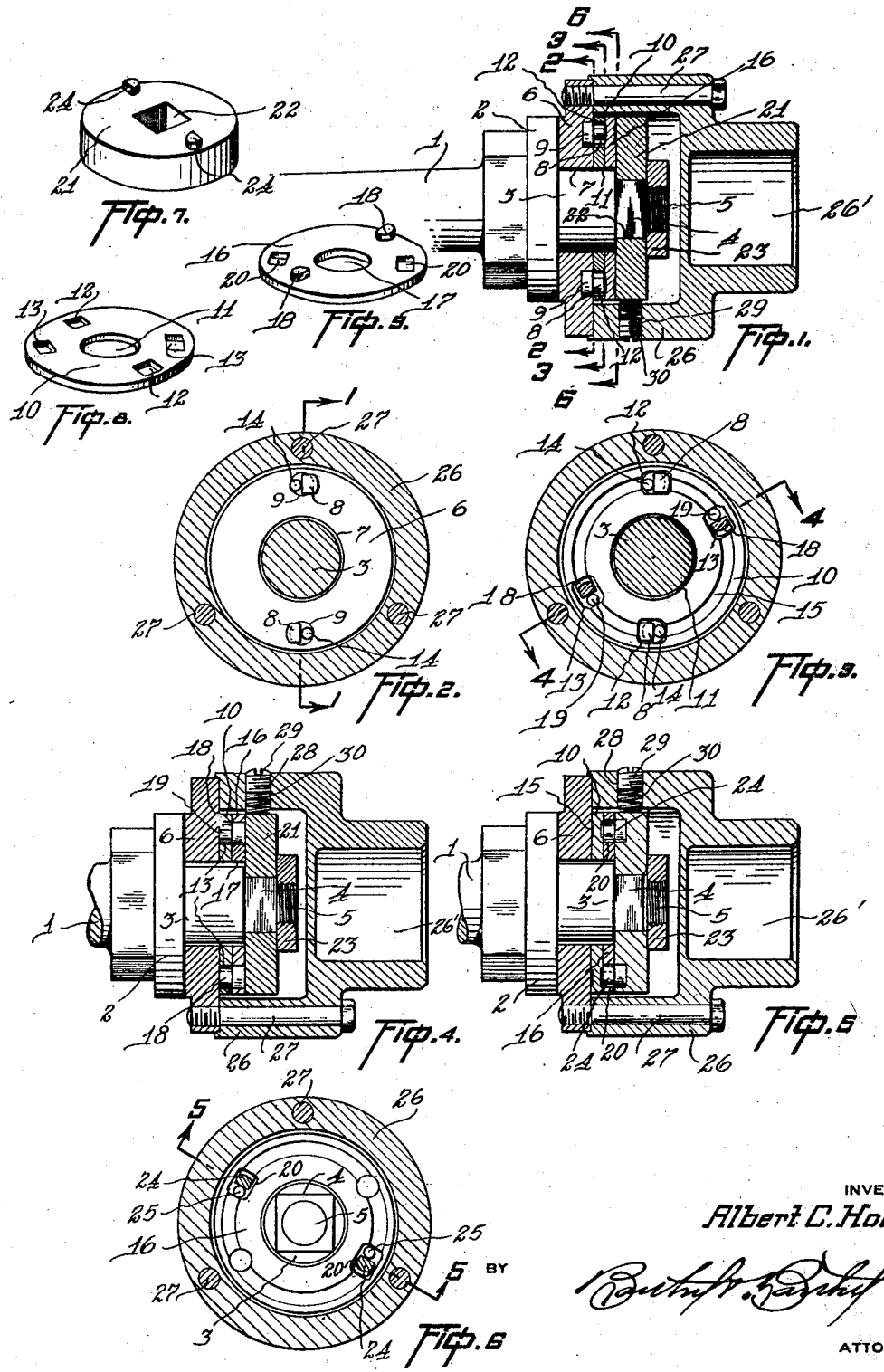
INVENTOR
Albert C. Hoeh
BY
ATTORNEYS Patented May 12, 1931

1,804,505

UNITED STATES PATENT OFFICE

ALBERT C. HOEH, OF ROYAL OAK, MICHIGAN

DRIVER FOR REAMERS AND THE LIKE

Application filed January 6, 1930. Serial No. 418,690.

The present invention pertains to a novel driver for reamers, grinders, lapping tools, drills, and various other similar instruments of similar character.

The primary object of the present invention is to devise a driver for operating tools, such as reamers, in blind bores so that the tool is capable of shifting or floating laterally relative to the power applied, thereby relieving the tool of stresses and strains set up between the tool and the driver shank when the tool is placed in operation. The tool is held to project outwardly from the end of the present driver which operates the tool so that it may be inserted into a blind bore to follow the center line thereof even though the center line of the bore is slightly offset from the center line of the driver without lateral stress or strain.

Another object of the present invention is to devise a reamer having a novel floating adapter or tool holder for supporting a tool that can accommodate or adjust itself so that the tool is held perfectly in line with the work to be performed and thereby insuring precision and equal distribution of power to the reamer blades from the driver shank.

With the above and other ends in view the invention consists in the matters hereinafter set forth and more particularly pointed out in the appended claims, reference being had to the accompanying drawing, in which Figure 1 is a longitudinal cross sectional view of the present driver equipped upon a specially formed shank, the view being taken on the line 1—1 of Fig. 2;

Fig. 2 is a transverse cross sectional view through the device on the line 2—2 of Fig. 1;

Fig. 3 is a cross sectional view through the device on the line 3—3 of Fig. 1;

Fig. 4 is a longitudinal cross sectional view through the device on the line 4—4 of Fig. 3;

Fig. 5 is a cross section on the line 5—5 of Fig. 6;

Fig. 6 is a cross section on the line 6—6 of Fig. 1, and

Figs. 7, 8 and 9 are perspective details of the driving disks.

Like characters are employed throughout to designate the corresponding parts.

The numeral 1 indicates a shank which is constructed in the conventional manner, known to the trade, the outer end which is broken away to economize in space being provided with the conventional driving tang. The opposite end of the shank terminates in an enlarged head 2 from which projects longitudinally a cylindrical body 3 formed integral and concentric with the head and shank. A reduced projection 4 extends outwardly from the end of the cylindrical body 3 and has a threaded projection 5 formed integral thereon.

A disk 6 is provided with a central bore 7 and is placed against the head 2 so that the cylindrical body 3 projects through the bore 7. The face of the disk 6 which is remote from the head is provided with outwardly projecting lugs 8 which are secured in the shallow recesses 9 formed in the disk. The face of the disk and the lugs are clearly illustrated in Figure 2 in the drawing.

A disk 10 having a central bore 11 is placed over the cylindrical body 3 to lie flat against the disk 6. A pair of perforations 12 and a pair of perforations 13 are provided in the disk 10, the perforations 12 receiving the lugs 8 which project thereinto. A roller 14 is inserted in each of these perforations to make contact with the side wall of the perforation and with the wall of the lug 8. A shallow groove 15 is provided in each face of the disk 10 for a purpose which will become apparent as the description progresses.

A disk 16 having a central bore 17 is placed over the cylindrical body 3 to lie flat against the disk 10, the disk 16 being provided with lugs 18 (similar to the lugs 8) to project into the perforations 13 in the disk 10, rollers 19 being inserted in the same manner as above described. The disk 16 is also provided with a pair of perforations 20.

A disk 21 having an angular opening 22 fits snugly over the angular projection 4 to butt against the end of cylindrical body 3 to be held in this position by a nut 23 which is screwed upon the threaded portion 5. The inner face of the disk 21 is provided with a pair of projecting lugs 24 which extend into the recesses 20 in the disk 16, rollers 25 being inserted in the above described manner.

From the above description it becomes apparent that the disk 21 rotates with the shank, being driven by means of the angular portion 4 and the angular opening 22. The disk 16 rotates with the disk 21 due to the connection established by the lugs 24 and the perforations 20. The lugs 18 in the disk 16 drive the disk 10 and the lugs 8 establish driving connection between the disk 10 and the disk 6. The lugs, perforations and rollers are formed to permit a certain amount of play radially but no play is permitted circumferentially. The bores 7, 11 and 17 are of an internal diameter greater than the cylindrical body 3 which also permits radial play.

It therefore, becomes apparent that the disk 6 is permitted to float at the same time that it is rotated and to accommodate a tool an adapter or tool holder 26′ is provided with a cup shaped portion 26 which completely envelopes the above described disks with the exception of the disk 6, it being secured to this latter disk by means of bolts 27.

To normally maintain the adapter or holder 26′ with its center line directly in line with the center line of the shank there is provided a plurality of radial bores 28 in the portion 26 in which are inserted plugs 29 which compress the springs 30 against the disk 21, which disk is stationary upon the shank.

From the above description it becomes apparent that the present invention provides a novel floating driver, simply constructed and readily accessible for repairs. The plurality of driving disks with their inter-engaging lugs and perforations permit lateral movement of a tool supported in the end of the driver to project outwardly therefrom. The rollers engaged between the walls of the perforations and the lugs might possibly be done away with and equal satisfaction obtained but while they are used it is found that by providing the disks with shallow grooves adjacent these rollers that the shearing or binding action is entirely eliminated. The shearing or binding action takes place when the disks are not tight against each other and when they are too tightly held the floating movement is resisted by the friction and therefore by reason of the grooves even though the rollers should tilt slightly they will not be forced against the adjacent disk in a manner which would tend to spread the disks apart.

If the edges of the perforations were to become slightly burred due to contact with the hardened metal rollers the burr would not project outwardly from the face of the disk but would merely project into the groove in the face of the disk. This permits the faces of the disks to lie in flat contact with each other at all times and this feature is absolutely essential to attain floating movement.

If dirt or grit or work filings or cuttings were to get between the disks they would become scored and scratched and the floating movement would be resisted to such an extent that damage could readily be done to the tool. The manner in which the device is formed with the tool holder surrounding the disks positively prevents any possibility of the disks being damaged in the above manner.

Although a specific embodiment of the present invention has been illustrated and described it is to be understood that various changes may be made within the scope of the appended claims without departing from the spirit of the invention, and such changes are contemplated.

What I claim is:

1. A tool driver comprising a shank, a floating disk mounted on said shank, a fixed disk mounted on said shank, a plurality of disks loosely mounted between said fixed disk and said floating disk, inter-engaging lugs and perforations on all of said disks, a tool holder having a portion adapted to receive a tool and a portion adapted to surround certain of said disks and to be secured to said first named floating disk, and resilient means mounted in said tool holder to act upon said fixed disk for normally preventing floating movement of said floating disk.

2. A tool driver comprising a shank, a floating disk mounted around said shank, a tool holder having a cup like portion adapted to surround a portion of said shaft and to be secured to said floating disk, a fixed disk mounted on said shank within said cup-like portion, a plurality of loosely mounted disks mounted between said fixed disk and said floating disk, perforations formed in said plurality of disks, lugs carried by certain of said disks of smaller cross sectional area than and adapted to project into said perforations, and rollers mounted between certain faces of said perforations and lugs whereby said disks may move laterally to permit lateral movement of said tool holder in a manner providing positive drive from said shank to said holder.

3. A tool driver comprising a shank, a floating disk mounted around said shank, a tool holder having a cup like portion adapted to surround a portion of said shaft and to be secured to said floating disk, a fixed disk mounted on said shank within said cup-like portion, a plurality of loosely mounted disks mounted between said fixed disk and said floating disk, perforations formed in said plurality of disks, lugs carried by certain of said disks of smaller cross-sectional area than and adapted to project into said perforations, rollers mounted between certain faces of said perforations and lugs whereby said disks may move laterally to permit lateral movement of said tool holder in a manner providing positive drive from said shank to said holder, and resilient means mounted in said cup-like portion and acting upon said fixed disk to normally prevent lateral movement of said cup-like portion.

4. A tool driver comprising a shank, a floating disk mounted around said shank, a tool holder having a cup like portion adapted to surround a portion of said shank and to be secured to said floating disk, a fixed disk mounted on said shank within said cup-like portion, a plurality of loosely mounted disks mounted between said fixed disk and said floating disk, perforations formed in said plurality of disks, lugs carried by certain of said disks of smaller cross sectional area than and adapted to project into said perforations, rollers mounted between certain faces of said perforations and lugs whereby said disks may move laterally to permit lateral movement of said tool holder in a manner providing positive drive from said shank to said holder, and grooves formed in the faces of certain of said disks adjacent said rollers.

5. A tool driver comprising a shank, a floating disk mounted around said shank, a tool holder having a cup-like portion adapted to surround a portion of said shaft and to be secured to said floating disk, a fixed disk mounted on said shank within said cup-like portion, a plurality of loosely mounted disks mounted between said fixed disk and said floating disk, perforations formed in said plurality of disks, lugs carried by certain of said disks of smaller cross-sectional area than and adapted to project into said perforations, rollers mounted between certain faces of said perforations and lugs whereby said disks may move laterally to permit lateral movement of said tool holder in a manner providing positive drive from said shank to said holder, resilient means mounted in said cup-like portion and acting upon said fixed disk to normally prevent lateral movement of said cup-like portion, and grooves formed in the faces of certain of said disks adjacent said rollers.

In testimony whereof I affix my signature.

ALBERT C. HOEH.